US010331867B2

(12) United States Patent
Perotti

(10) Patent No.: US 10,331,867 B2
(45) Date of Patent: Jun. 25, 2019

(54) ENHANCED BIOMETRIC USER AUTHENTICATION

(71) Applicant: Plantronics, Inc., Santa Cruz, CA (US)

(72) Inventor: Erik Perotti, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 175 days.

(21) Appl. No.: 15/286,443

(22) Filed: Oct. 5, 2016

(65) Prior Publication Data

US 2018/0096118 A1 Apr. 5, 2018

(51) Int. Cl.
*G06F 21/32* (2013.01)
*G06F 16/683* (2019.01)
*H04L 9/06* (2006.01)

(52) U.S. Cl.
CPC ............ *G06F 21/32* (2013.01); *G06F 16/683* (2019.01); *H04L 9/0656* (2013.01)

(58) Field of Classification Search
CPC .... H04L 9/3231; H04L 63/0861; G06F 21/32
See application file for complete search history.

(56) References Cited

U.S. PATENT DOCUMENTS 6,144,756 A * 11/2000 Takahashi ............ G06K 9/0002 340/5.86
6,219,639 B1 4/2001 Bakis et al.
8,009,874 B2 8/2011 Brown
8,315,876 B2 * 11/2012 Reuss ..................... G10L 17/24 700/175
8,972,739 B1 3/2015 Rosener
9,286,742 B2 3/2016 Rosener et al.
10,074,089 B1 * 9/2018 Rangaraj .......... G06Q 20/40145
2005/0171851 A1 * 8/2005 Applebaum ............ G06F 21/32 705/18
2007/0107051 A1 * 5/2007 Carter ..................... G06F 21/31 726/21

(Continued)

FOREIGN PATENT DOCUMENTS

EP 1164576 A1 12/2001

OTHER PUBLICATIONS

Unknown, Nuance VocalPassword™ v9 :: Product Description, Nuance :: customer care solutions, found at URL <http://www.nuance.com/ucmct/groups/imaging/@web-enus/documents/collateral/nucc1021vocalpasswordv9proddes.pdf> on Apr. 27, 2016.

*Primary Examiner* — Theodore C Parsons
*Assistant Examiner* — Carlos M De Jesus Lassala
(74) *Attorney, Agent, or Firm* — Chuang Intellectual Property Law

(57) ABSTRACT

Methods and apparatuses for enhanced user biometric authentication are described. In one example, authenticating a user includes storing user authentication pairs in a memory of an authenticator device, each authentication pair comprising an instruction prompt and a stored corresponding user response biometric to the instruction prompt. A request to authenticate a user is received at the authenticator device from an authentication requestor device. An instruction prompt is output from a selected authentication pair, and a current user response to the instruction prompt is received. A current user biometric is generated from the current user response. An identity of the user is authenticated by comparing the current user biometric to the stored corresponding user response biometric for the instruction prompt output.

15 Claims, 13 Drawing Sheets

(56) References Cited

U.S. PATENT DOCUMENTS

| | | | | |
|---|---|---|---|---|
| 2008/0133956 | A1* | 6/2008 | Fadell | G06F 1/3203 713/340 |
| 2010/0042848 | A1 | 2/2010 | Rosener | |
| 2010/0227305 | A1* | 9/2010 | Bakir | G09B 7/00 434/350 |
| 2012/0050008 | A1* | 3/2012 | Rosener | G07C 9/00142 340/5.21 |
| 2014/0090039 | A1* | 3/2014 | Bhow | H04W 12/06 726/7 |
| 2016/0253487 | A1 | 9/2016 | Sarkar et al. | |

* cited by examiner

16

28 30

| Challenge Question | Answer Voiceprint |
|---|---|
| Challenge Question 1 | Answer 1 voiceprint |
| Challenge Question 2 | Answer 2 voiceprint |
| Challenge Question 3 | Answer 3 voiceprint |

FIG. 3

ENHANCED BIOMETRIC USER AUTHENTICATION

BACKGROUND OF THE INVENTION

User authentication can be understood to be the act of proving to a computer-based system that a user is who she or he claims to be (i.e., authentication of the identity of the user). User authentication is often described in terms of something you know (e.g., a password), something you have (e.g., an ATM card), or something you are (e.g., fingerprint). User authentication is the process of verifying one or more of these factors.

For example, a typical computer user is required to authenticate himself for a wide variety of purposes, such as logging in to a computer account, retrieving e-mail from servers, accessing certain files, databases, networks, web sites, etc. In banking applications, a bank account holder is required to enter a personal identification number (PIN) in order to access an automated teller machine (ATM) to conduct a banking transaction.

The main problem to be solved is authenticating in a convenient and secure way. Many systems for user authentication are available although none are completely satisfactory. For example, existing authentication solutions typically have a user type a password or personal identification number (PIN), also called credentials.

Using passwords is both tedious and often not very secure. For example, others can see or overhear passwords. A major problem is remembering multiple passwords and users are forced either to use the same password for all authentication systems (not secure) or forever recover/reset passwords as they become forgotten. Users may choose very simple, easily ascertained passwords. If a more difficult password is chosen, the user may write the password down, making it subject to theft. Broadly speaking, there is a continuum with passwords—those that are easy to remember and those that that are obscure, making them harder to guess. To date, authenticators have been singular. You have a password. You lose it, you need a new one.

Biometrics such as fingerprints, retinal scans, and voice characteristics can also be used to help uniquely identify an individual. However, biometrics can and will be spoofed. For example, a user's fingerprint can be recreated from an existing sample and used to fool a fingerprint scanner.

As a result, improved methods and apparatuses for user authentication are needed.

BRIEF DESCRIPTION OF THE DRAWINGS

The present invention will be readily understood by the following detailed description in conjunction with the accompanying drawings, wherein like reference numerals designate like structural elements.

FIG. 3 illustrates an illustration of a data structure at the authenticator shown in FIG. 2 storing biometric authentication data.

DESCRIPTION OF SPECIFIC EMBODIMENTS

Figure 1:
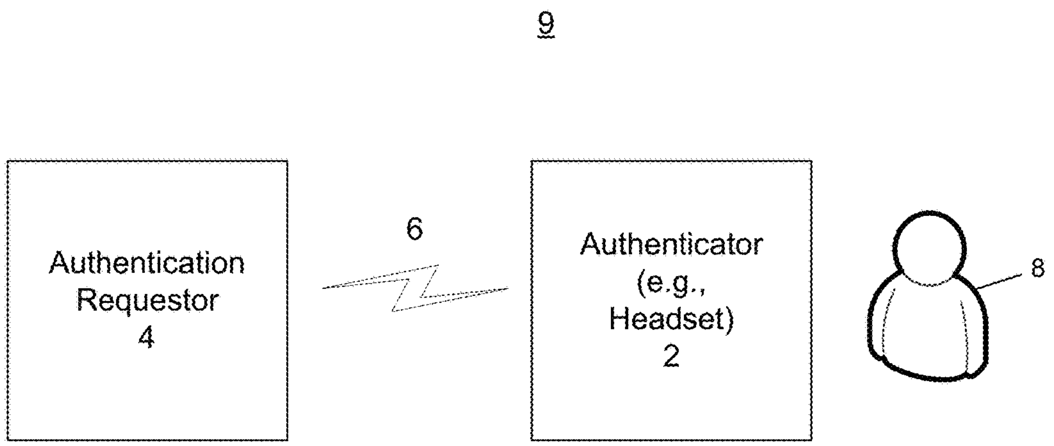
FIG. 1 illustrates a system for user authentication in one example.

Methods and apparatuses for enhanced user authentication are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example embodiment of the invention, a method for using a body worn authenticator device includes storing a plurality of user authentication pairs in a memory of a body worn device, each authentication pair comprising a challenge question and a corresponding voiceprint (also referred to as a "voice print") of a user spoken answer to the challenge question. The method includes receiving at the body worn device from an authentication requestor device a request to authenticate a user. The method further includes selecting a challenge question from a selected authentication pair from the plurality of user authentication pairs, and outputting the challenge question at a speaker of the body worn device. The method includes receiving a user spoken response at a microphone of the body worn device, and generating a response voiceprint from the user spoken response. The method further includes authenticating an identity of the user comprising comparing the response voiceprint to the corresponding voiceprint to the challenge question.

In one example, a head worn authenticator device includes a microphone, a speaker, and a wireless communications transceiver operable to receive an authentication request from an authentication requestor device. The head worn authenticator device further includes a processor and a memory. The memory includes two or more user authentication pairs, each authentication pair comprising a challenge question and a corresponding voiceprint of a user spoken answer to the challenge question. The memory further includes an application program having executable instructions to (1) receive the authentication request, (2) output audio at the speaker of a challenge question from the two or more user authentication pairs, (3) receive a user spoken response at the microphone, (4) generate a response voiceprint from the user spoken response, and (5) validate an identity of the user by comparing the response voiceprint to the corresponding voiceprint to the challenge question.

In one example, a method for authenticating a user includes storing a plurality of user authentication pairs in a memory of an authenticator device, each authentication pair comprising an instruction prompt and a stored corresponding user response biometric to the instruction prompt. The method includes receiving at the authenticator device from an authentication requestor device a request to authenticate a user. The method further includes outputting an instruction prompt from a selected authentication pair from the plurality of user authentication pairs, and receiving a current user response to the instruction prompt. The method includes generating a current user biometric from the current user response, and authenticating an identity of the user comprising comparing the current user biometric to the stored corresponding user response biometric for the instruction prompt output.

In one example, a method for user authentication includes storing a plurality of user authentication pairs in a memory of an authenticator device, each authentication pair comprising a challenge question and a corresponding voiceprint of a user spoken answer to the challenge question. The method includes receiving a request to authenticate a user. The method includes selecting a challenge question from a selected authentication pair from the plurality of user authentication pairs, and outputting the challenge question at a speaker of a body worn device. The method further includes receiving a user spoken response at a microphone of the body worn device, and generating a response voiceprint from the user spoken response. The method includes authenticating an identity of the user comprising comparing the response voiceprint to the corresponding voiceprint to the challenge question.

In digital security, two-factor authentication may be made up of (1) what you know and (2) what you have. In one example, both of these are accomplished from a headset itself. For "what you know", a unique voiceprint is pushed to the headset. The user generates her voiceprint, and it is then used for comparison purposes. For "what you have," the device can store an applet, which can be used in conjunction with encryption for second factor authentication. In one example embodiment of the invention, an authenticator (e.g., a headset), instead of blindly making a passphrase request, includes firmware logic that chooses from the enrolled triggers, selects one (e.g., using a random-number generator or similar), and prompts the user to utter not her passphrase, but the answer to a question instead. Advantageously, there is not a one-to-one correlation between a user and a password. By adding intelligence to the (on-board and/or companion) authenticator, security is greatly enhanced. Advantageously, the randomness of the request enhances security.

The headset securely stores multiple pieces of biometric data and has intelligence to both randomly request a challenge and evaluate it for authentication success or failure. For example, the headset may store five unique voiceprints and evaluate them for authentication. The headset may include a random-number generator to decide which voiceprint to request.

In one embodiment, all authentication processing is performed on-board (i.e., on the headset). When an authentication request is made of the headset, it simply responds with an event for either success or failure to the host device (e.g., a smartphone). From the host device perspective, there is no difference that the authentication is performed on-board the headset. When required, the host asks for user authentication and takes action based on the returned value from the headset. In one embodiment, use of voice as the biometric to respond to challenges is particularly advantageous as the user can respond with voice to each challenge with the same level of ease as any other challenge.

In one example embodiment of this invention, the smartphone (also referred to as a "smart phone") sends a user authentication request to the headset. When requested, the headset will randomly pick its authentication challenge, and pass that challenge on to the user, e.g., "Say Your Mother's Maiden Name." The next time, it may be "What Was the Name of Your First Pet?" or countless other requests. The headset receives the user spoken response and determines whether the identity of the user is authenticated. Advantageously, this process enhances security without adding any burden to the user. For the typical person, it is assumed to be no more difficult to recall and say one word over another, as long as the trigger makes sense. In fact, it may be simpler for the end user because the voice prompt is tailored.

In a further embodiment of the invention, the random challenge request is passed from the host device, rather than processed internally on the companion (e.g., the headset). In various examples, there are a number of derivations here, where processing is done on the host device or companion. For example, the voice prompts are created on the host device and validated there too. In this embodiment, this would mean that an audio connection would be established between the companion and host devices, and the headset would simply play the prompt from the host and return the headset owner's response over the Bluetooth hands-free-profile (HFP). Similarly, a cloud service is utilized in one example for generating voice prompts and validating the responses.

In further examples, the random challenge could apply to alternate biometrics. For example, an iris scan is used. Random challenges in this example can be to ask the user to look straight ahead, look left, right etc. In a further example, enrolled fixed triggers are used, where the pass phrase is common, but the voiceprint of each wearer is unique. For example, random questions could be about a company, its founders, or several other topics that would be known to an associate, but not the public at large. In a further example, artificial intelligence may be utilized to predict how a wearer may sound when they utter a pass phrase—a voice prompt like "Say your mother's maiden name with an Italian accent" for example. These examples demonstrate that the person being validated is a thinking being, that he or she can respond to voice prompts in a more sophisticated way than simply rote memorization.

FIG. 1 illustrates a user authentication system 9 according to an embodiment of the present invention. The authentication system 9 includes an authenticator device 2 and an authentication requestor device 4. The authenticator device 2 is configured to authenticate a user, when the user requests access to resources from a secure system requiring user authentication.

In one example, the authenticator device 2 is advantageously a body worn device such as a headset. While the term "headset" has various definitions and connotations, for the purposes of this disclosure, the term is meant to refer to any head-worn device capable of performing operations described herein. The headset may utilize either a single headphone (e.g., a monaural headset) or a pair of headphones (e.g., a binaural headset). In further examples, authenticator device 2 may also be a computing device, cellular phone, a personal heads-up display (HUD) device, a personal digital assistant (PDA), or any suitable device for presenting and receiving authentication related information. In one example, the authentication requestor device 4 is advantageously a smartphone. In further examples, authentication requestor device 4 may also be any suitable computing device for requesting user authentication. Authenticator device 2 stores an authentication application as described below in reference to FIG. 2.

According to one embodiment of the invention, data communication between the authentication requestor device 4 and the authenticator device 2 is transmitted via a wireless link 6. For example, wireless link 6 is a Bluetooth wireless link, a Wi-Fi (IEEE 802.11) wireless link, a Wi-Max (IEEE 802.16) link, a cellular communications wireless link, or other wireless communications link. In a further embodiment, data communication between the authentication requestor device 4 and the authenticator device 2 is transmitted via a wired link (e.g., a Universal Serial Bus (USB)). In one embodiment, authentication requestor device 4 is any secure computer system which the user 8 wishes to access to perform a desired action. For example, the secure system may be a website such as a financial institution website at which user 8 wishes to access account information or perform a financial transaction. For example, user authentication may be performed at a website, such as logging onto the website at first instance, or to make a purchase at the website.

In one embodiment, data communication between the authentication requestor device 4 and the authenticator device 2 is transmitted via one or more communication networks. For example, the one or more networks may include an Internet Protocol (IP) network, cellular communications network, IEEE 802.11 wireless network, or any combination thereof.

According to operation in an example embodiment, authenticator device 2 stores a plurality of user authentication pairs in a memory of the authenticator device 2. Each authentication pair includes a challenge question and a corresponding voiceprint of a user spoken answer to the challenge question.

The voiceprint is a statistical model of the user's voice, and is based on acoustic and linguistic properties. In one example, each authentication pair is created during an initial enrollment session. The user is asked a challenge question, and verbally responds with the correct answer. An answer voiceprint is constructed, whereby the characteristics of the user's speech are used to build the voiceprint associated with that user for this particular challenge question. For example, the voiceprint is a calculated set of numeric parameters which quantify biometric characteristics of the user's voice, such as frequency spectrum, timing, and amplitude. Gaussian mixture models, hidden Markov models, frequency estimation, and other techniques may be used to process voiceprints. This generated voiceprint is then stored for future use.

At a later time when the user is to be authenticated, the user enters his purported identity (if there are multiple authorized users of the authenticator device 2), is asked a challenge question, and responds verbally with his answer. The authenticator device 2 authenticates the user by comparing the user's real-time speech with the previously stored copy of the speaker's voiceprint for the posed challenge question to ensure both that the correct answer has been provided (e.g., something the authorized user knows) and that the acoustic and linguistic properties match (e.g., something the authorized user is).

In an example operation, a request to authenticate a user is received at the authenticator device 2 from the authentication requestor device 4. For example, body worn authenticator device 2 is a Bluetooth headset and the authentication requestor device 4 is a smartphone. Authenticator device 2 selects a challenge question (i.e., by selecting an authentication pair from the plurality of user authentication pairs), and outputs the challenge question at a speaker of the authenticator device 2. In one example, the selected authentication pair is randomly selected from the plurality of user authentication pairs.

A user spoken response is received at a microphone of the authenticator device 2, and a response voiceprint is generated from the user real-time spoken response. An identity of the user is either authenticated or not authenticated by comparing the response voiceprint to the corresponding voiceprint to the challenge question (i.e., authentication occurs if there is a match and does not occur if there is not a match).

Authenticator device 2 reports the authentication success or authentication failure to the authentication requestor device 4 over wireless link 6. Authenticator device 2 also outputs an authentication success (or failure) voice message at the speaker of the authenticator device 2 following the authentication process.

Figure 2:
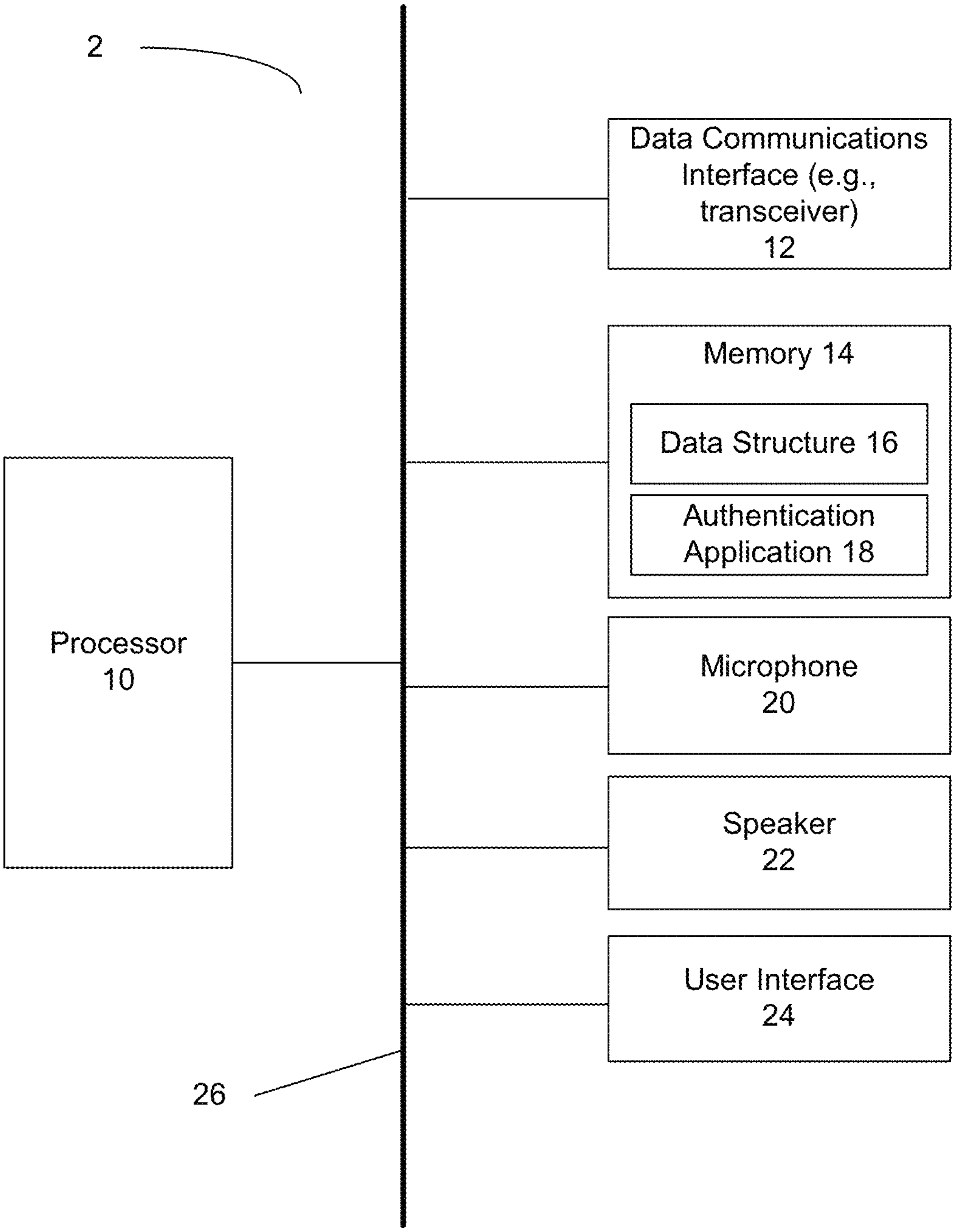
FIG. 2 illustrates a simplified block diagram of the authenticator shown in FIG. 1.

FIG. 2 illustrates a simplified block diagram of the authenticator device 2 shown in FIG. 1 capable of performing user authentication (also referred to herein as user validation) utilizing voiceprint identification. The authenticator device 2 includes a processor 10 operably coupled via an interconnect 26 to a data communications interface 12, memory 14, a microphone 20, a speaker 22, and a user interface 24. In one example, data communications interface 12 is a wireless communications transceiver (e.g., utilizing Bluetooth communications) operable to receive an authentication request from the authentication requestor device 4.

Memory 14 stores a data structure 16 (e.g., a database, table, or any other file/memory structure) for storing user authentication data as described herein, and an authentication application 18 (e.g., including a voiceprint match application for comparing the voiceprint of user received speech to an authorized voiceprint stored in data structure 16). Memory 14 may also include pre-stored audio prompts for output through the authenticator device speaker 22 which output challenge questions and prompt the user to speak his response to challenge questions, his name, etc.

Memory 14 may include a variety of memories, and in one example includes SDRAM, ROM, flash memory, or a combination thereof. Memory 14 may further include separate memory structures or a single integrated memory structure. In one example, memory 14 may be used to store passwords, network and telecommunications programs, and/or an operating system (OS).

Processor 10, using executable code and applications stored in memory, performs the necessary functions associated with user authentication and authenticator device operation described herein. Processor 10 further processes user speech received at microphone 20 using authentication application 18. In one example, processor 10 is a high performance, highly integrated, and highly flexible system-on-chip (SoC), including signal processing functionality such as echo cancellation/reduction and gain control in another example. Processor 10 may include a variety of processors (e.g., digital signal processors), with conventional CPUs being applicable. User interface 24 allows for manual communication between the headset user and the headset, and in one example includes an audio and/or visual interface such that an audio prompt may be provided to the user's ear and/or an LED may be lit.

In further examples, authenticator device 2 may include additional biometric input devices for authenticating the identity of user 8. For example, authenticator device 2 may include a fingerprint scanner for scanning a user fingerprint or a retinal scanner for scanning a user retina.

FIG. 3 is a simplified illustration of the contents of data structure 16 at the authenticator shown in FIG. 2 storing biometric authentication data. In one embodiment, data structure 16 stores two or more user authentication pairs, each authentication pair comprising a challenge question 28 and a corresponding answer voiceprint 30 of a user spoken answer to the challenge question. Data structure 16 may store similar data for each authorized user. The challenge questions 28 may be stored in text format which are output via a text-to-speech converter at speaker 22. Alternatively, challenge questions 28 may be stored as audio files.

Authentication application 18 includes executable instructions executable by processor 10 to receive the authentication request from authentication requestor device 4. Authentication application 18 outputs audio at the speaker 22 of a challenge question from data structure 16, and receives a user spoken response at the microphone 20. Authentication application 18 may randomly select the challenge question 28 output to the user. Authentication application 18 generates a response voiceprint from the user spoken response, and authenticates an identity of the user by comparing the response voiceprint to the corresponding voiceprint to the challenge question stored in data structure 16.

In a further example, the selection of the challenge question 28 output to the user is context based rather than random, such as based on the location of the user. For example, one question is output if the user is located near his car and a second question is output if the user is located near his office. In a further example, the selection of challenge question 28 output to the user is sequential in a predetermined order rather than random.

Authentication application 18 reports an authentication success or authentication failure to the authentication requestor device 4 utilizing the data communications interface 12. Authentication application 18 outputs at the speaker 22 an authentication success voice message at the speaker 22 of the body worn device following successful authentication of the identity of the user. Alternatively, authentication application 18 outputs at the speaker 22 an authentication failure voice message at the speaker 22 of the body worn device following an authentication failure.

Figure 4:
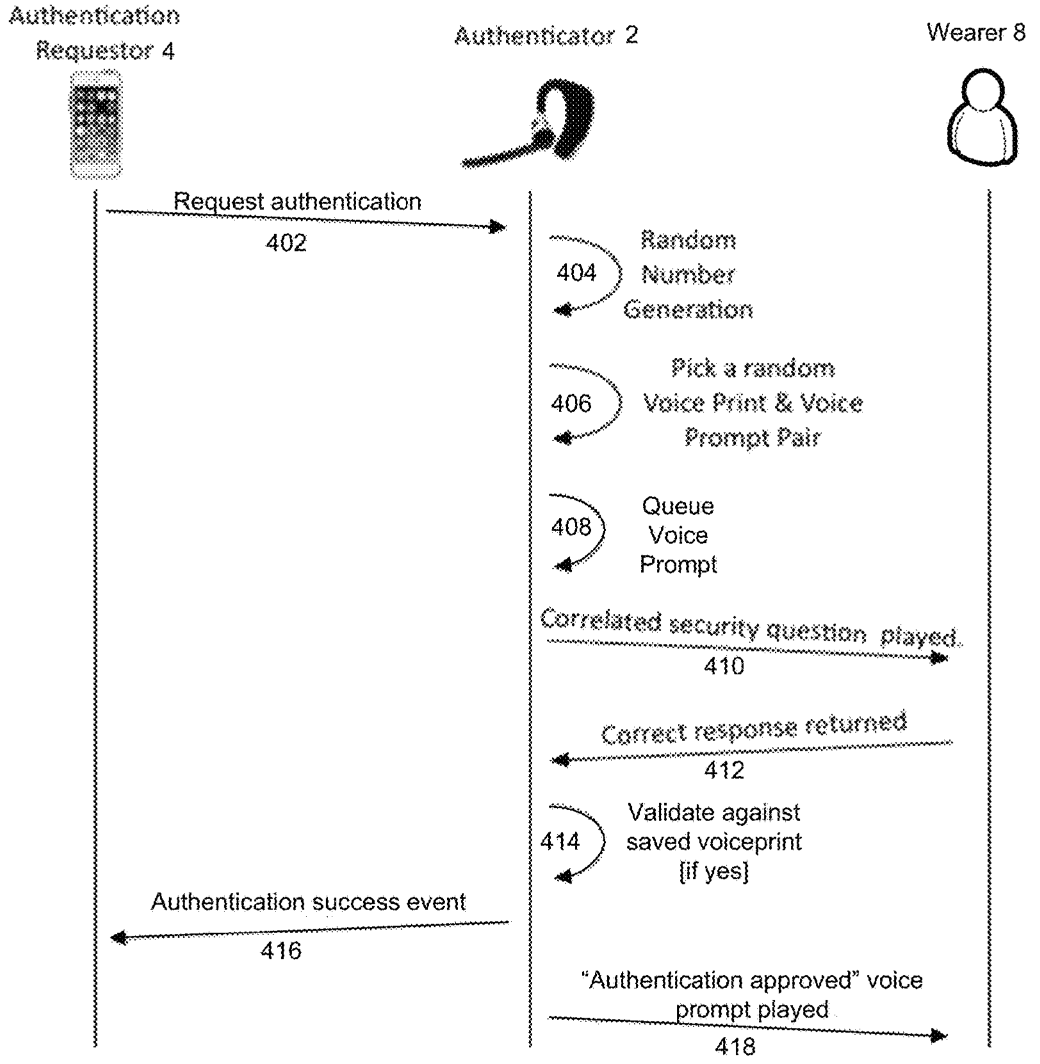
FIG. 4 illustrates a process for user authentication in one example.

FIG. 4 illustrates a process for user authentication in one example allowing a user 8 (e.g., a headset wearer) to access a secure system. At step 402, authentication requestor 4 transmits a user authentication request to authenticator device 2. At step 404, authenticator device 2 generates a random number. This random number is used at step 406 to select a random voiceprint and voice prompt pair.

At step 408, the voice prompt is queued for output at authenticator device 2. At step 410, the correlated security question is played to user 8. At step 412, the response from user 8 is returned (e.g., a correct response to the security question). At step 414, the response is validated against the saved voiceprint at authenticator device 2. If the response is validated as yes, at step 416, the authenticator device 2 reports an authentication success event to authentication requestor 4. At step 418, authenticator device 2 plays an "authentication approved" voice prompt to user 8.

In various embodiments, the techniques of FIGS. 5A-5B to FIGS. 8A-8B discussed below may be implemented as sequences of instructions executed by one or more electronic systems. In one embodiment, the instructions may be stored by the authenticator device 2 or the instructions may be received by the authenticator device 2 (e.g., via a network connection).

Figure 5A:
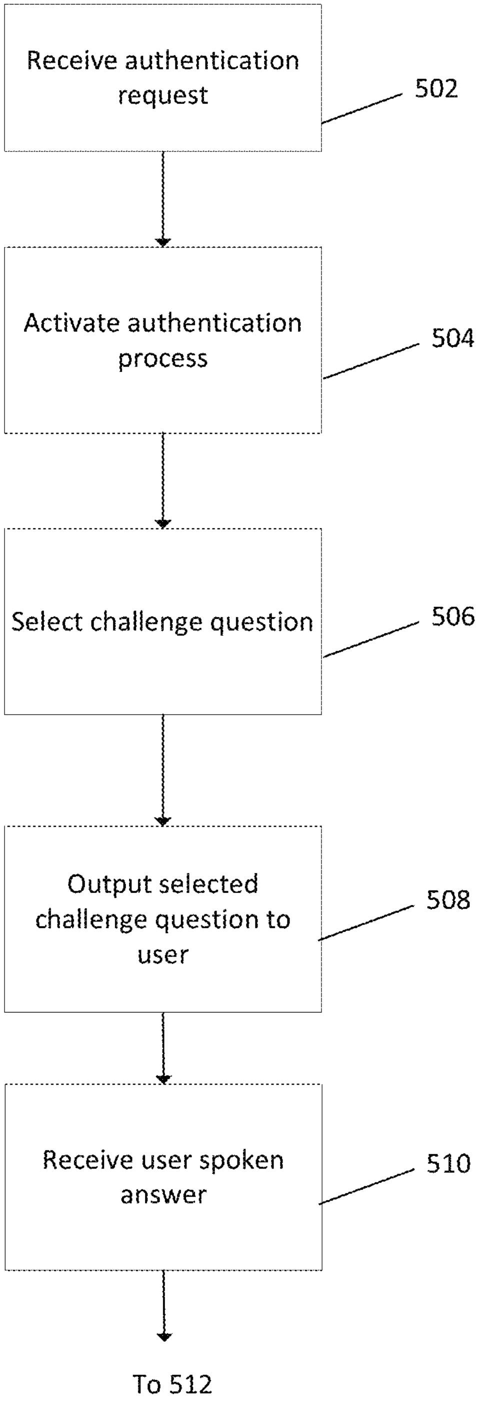
FIGS. 5A and 5B are a flow diagram illustrating a process for user authentication in a further example.
Figure 5B:
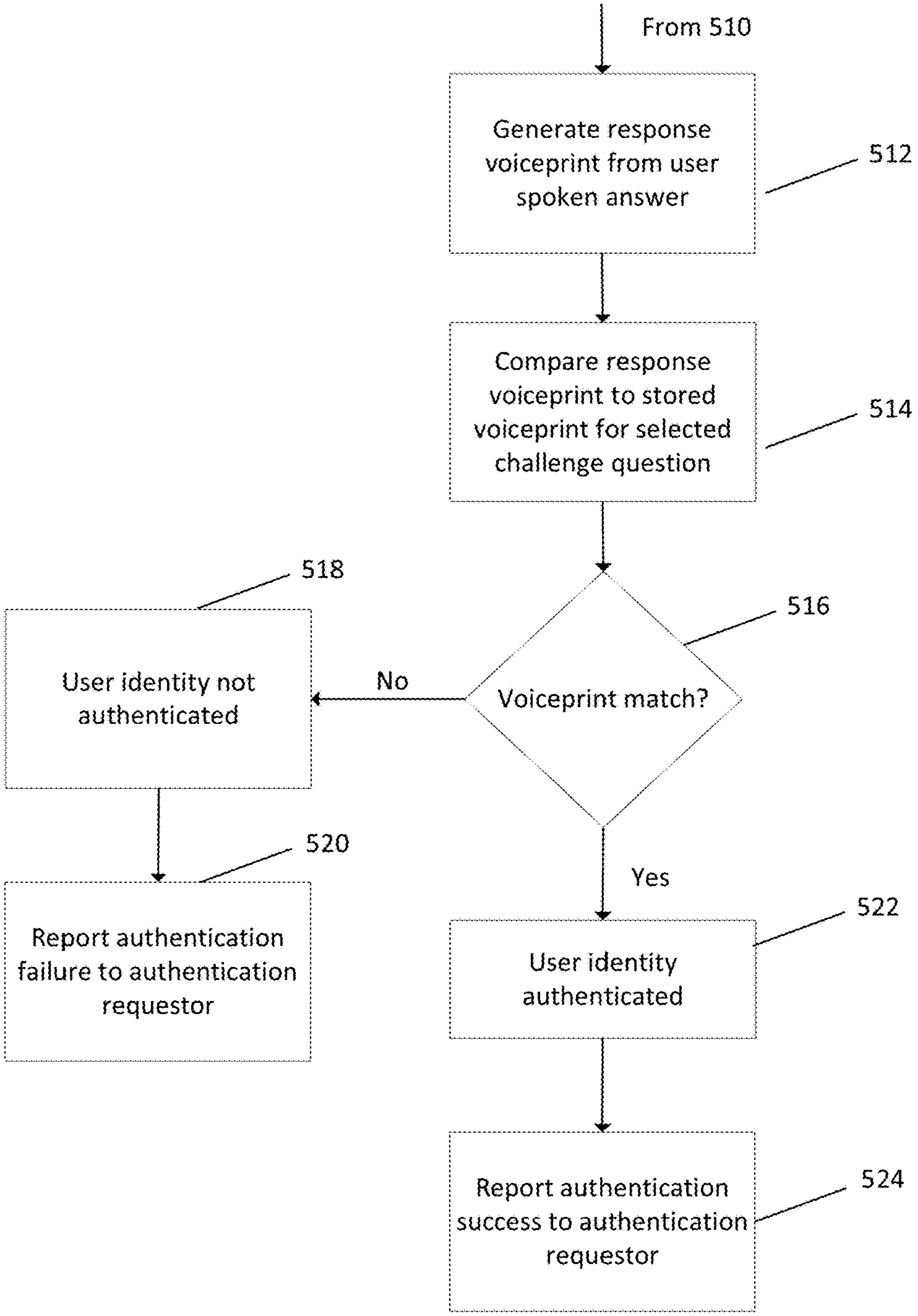

FIGS. 5A and 5B are a flow diagram illustrating a process for user authentication in a further example. In one example, the process illustrated in FIGS. 5A and 5B is implemented at authenticator device 2 shown in FIG. 1. At block 502, an authentication request is received at an authenticator device from an authentication requestor device. For example, the authentication requestor device may send the authentication request after a user requests access to a resource at the authentication requestor device.

At block 504, the authentication process is activated. At block 506, a challenge question is selected. At block 508, the selected challenge question is output to the user. At block 510, the user spoken answer is received. At block 512, a response voiceprint is generated from the user spoken answer. At block 514, the response voiceprint is compared to a stored voiceprint corresponding to the selected challenge question.

At decision block 516 it is determined whether there is a match between the response voiceprint and the stored voiceprint. If no at decision block 516, at block 518 the user identity is not authenticated. At block 520, an authentication failure is reported to the authentication requestor. If yes at decision block 516, at block 522 the user identity is authenticated. At block 524, an authentication success is reported to the authentication requestor.

Figure 6A:
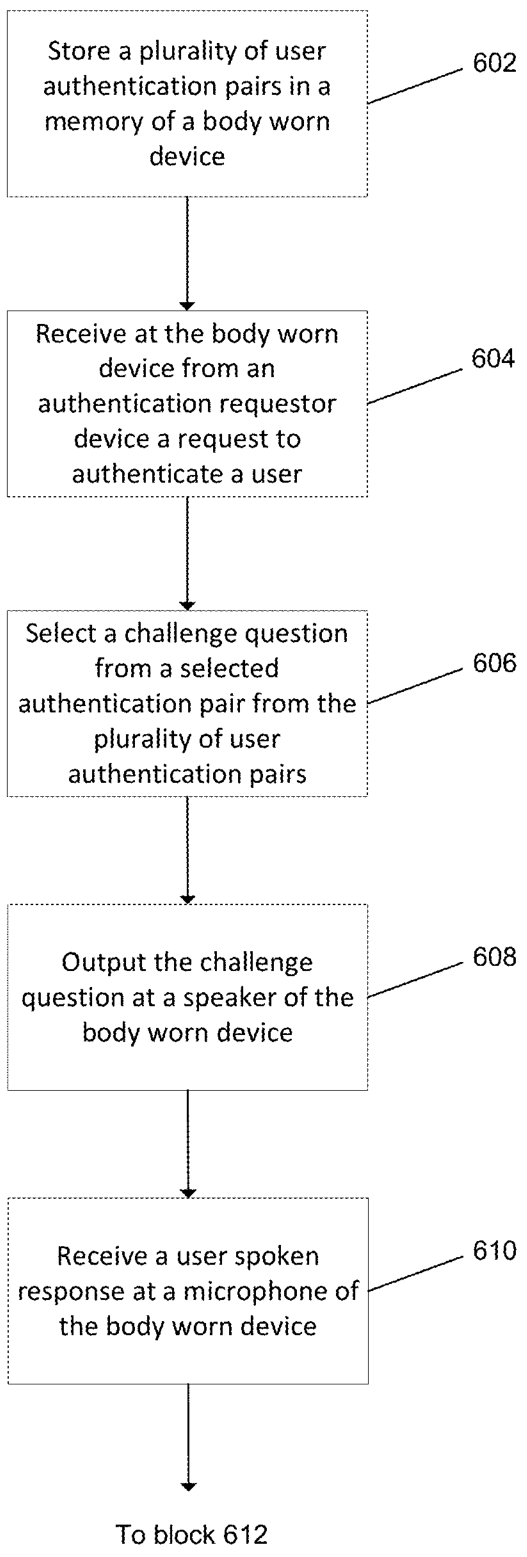
FIGS. 6A and 6B are a flow diagram illustrating a process for user authentication in a further example.
Figure 6B:
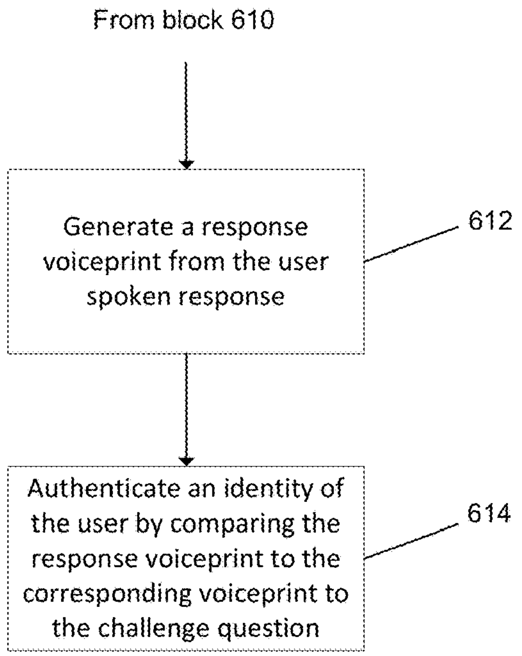

FIGS. 6A and 6B are a flow diagram illustrating a process for user authentication in a further example. At block 602, a plurality of user authentication pairs is stored in a memory of a body worn device. For example, each authentication pair includes a challenge question and a corresponding voiceprint of a user spoken answer to the challenge question.

At block 604, a request to authenticate a user is received at the body worn device from an authentication requestor device. In one example, the body worn authenticator device is a head-worn device. In one example, the body worn authenticator device is a Bluetooth headset and the authentication requestor device comprises a smartphone.

At block 606, a challenge question is selected from a selected authentication pair from the plurality of user authentication pairs. In one example, the selected authentication pair is randomly selected from the plurality of user authentication pairs. At block 608, the challenge question is output at a speaker of the body worn device.

At block 610, a user spoken response is received at a microphone of the body worn device. At block 612, a response voiceprint is generated from the user spoken response. At block 614, an identity of the user is authenticated (or not authenticated) by comparing the response voiceprint to the corresponding voiceprint to the challenge question and determining if there is a match. In one example, an authentication success or authentication failure is reported to the authentication requestor device. In one example, an authentication success (or failure) voice message is output at the speaker of the body worn device following authenticating the identity of the user.

Figure 7A:
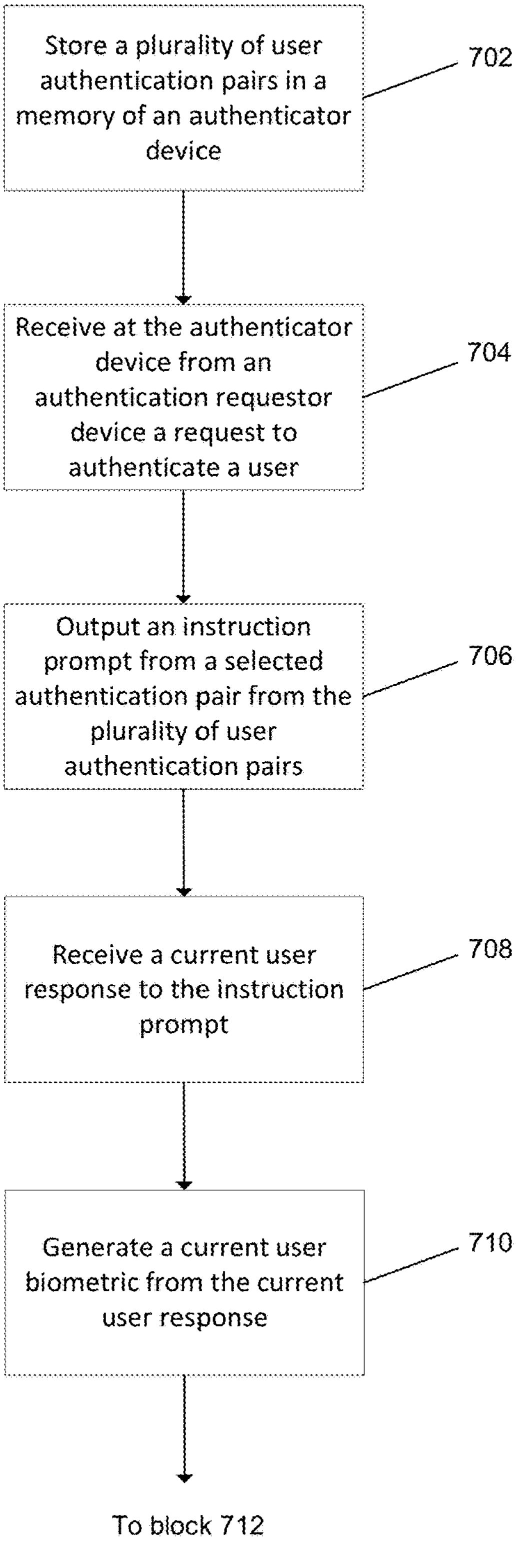
FIGS. 7A and 7B are a flow diagram illustrating a process for user authentication in a further example.
Figure 7B:
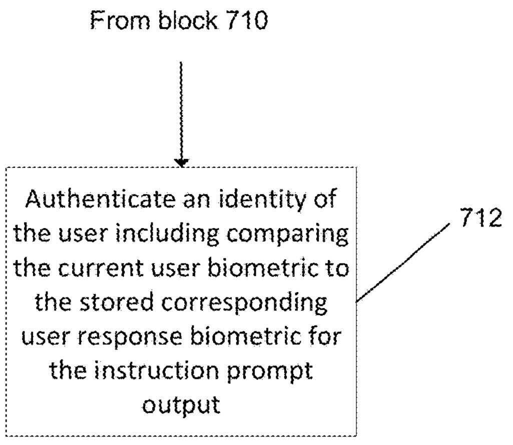

FIGS. 7A and 7B are a flow diagram illustrating a process for user authentication in a further example. At block 702, a plurality of user authentication pairs is stored in a memory of an authenticator device. For example, each authentication pair includes an instruction prompt and a stored corresponding user response biometric to the instruction prompt.

At block 704, a request to authenticate a user is received at the authenticator device from an authentication requestor device. In one example, the authenticator device is a head-worn device. In one example, the authenticator device is a Bluetooth headset and the authentication requestor device is a smartphone.

At block 706, an instruction prompt is output from a selected authentication pair from the plurality of user authentication pairs. In one example, the instruction prompt is a challenge question prompting the user to provide a verbal answer and the stored corresponding user response biometric to the instruction prompt is a voiceprint of the verbal answer. In a further example, the instruction prompt is an instruction to scan a fingerprint of a specific finger of the user (e.g., left ring finger). In one example, the selected authentication pair is randomly selected from the plurality of user authentication pairs.

At block 708, a current user response to the instruction prompt is received. At block 710, a current user biometric is generated from the current user response. In one example, receiving the current user response includes receiving a user verbal answer at a microphone of the authenticator device and generating a current user biometric from the current user response includes generating a voiceprint from the current user response.

At block 712, an identity of the user is authenticated (or not authenticated) by comparing the current user biometric to the stored corresponding user response biometric for the instruction prompt output. In one example, an authentication success or authentication failure is reported to the authentication requestor device. Advantageously, the authentication requestor device only receives an approval or denial indication. An authentication success (or failure) voice message is output at the speaker of the authenticator device following authenticating (or not authenticating) the identity of the user.

Figure 8A:
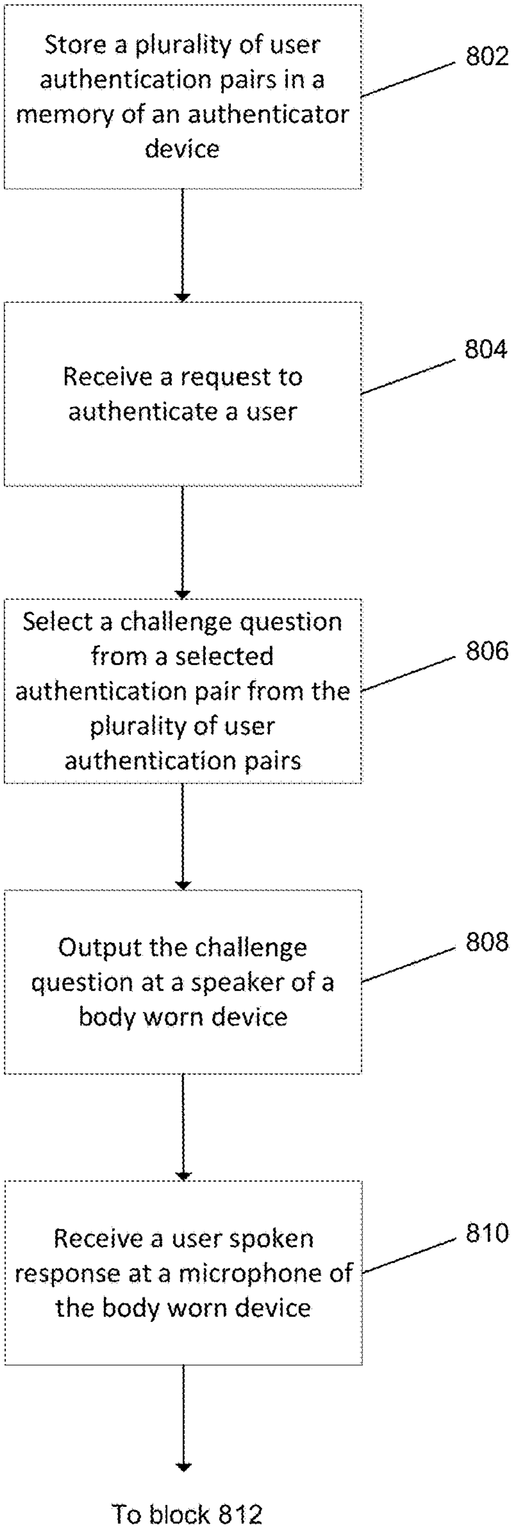
FIGS. 8A and 8B are a flow diagram illustrating a process for user authentication in a further example.
Figure 8B:
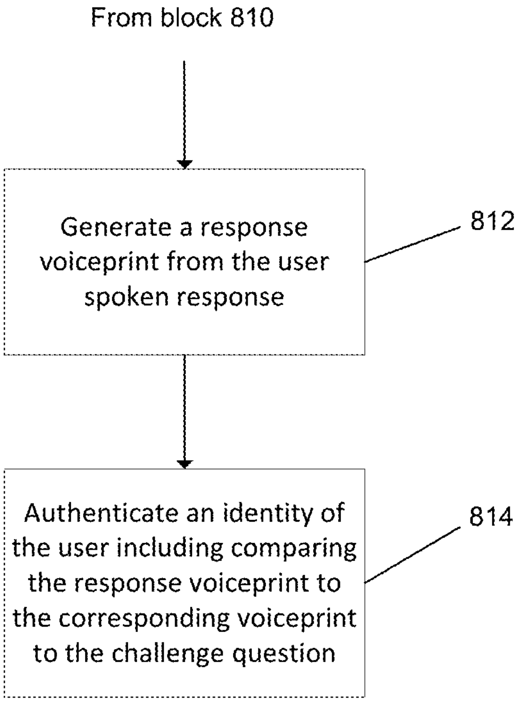
Figure 9:
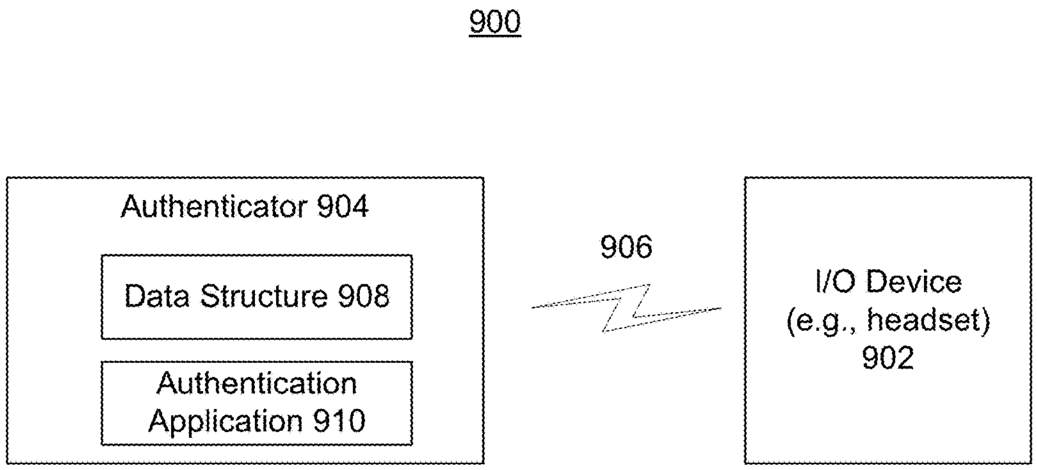
FIG. 9 is illustrates a system for user authentication in one example.

FIG. 9 is illustrates a user authentication system 900 in a further example. In one example, the system 900 is utilized to implement the process shown in FIGS. 8A and 8B. The authentication system 900 includes an authenticator device 904 and an I/O device 902. The authenticator device 904 is configured to authenticate a user, when the user requests an access to resources from an authentication requestor device (e.g., a secure system) requiring user authentication. In one example, the I/O device 902 is advantageously a body worn device such as a headset. In one example, authenticator device 904 is a smartphone having a memory storing a data structure 908 and authentication application 910. In further examples, authenticator device 904 may be a tablet computer, laptop computer, or any computing device.

According to one embodiment of the invention, data communication between the authenticator device 904 and I/O device 902 (e.g., voice prompts and wearer speech) is transmitted via a wireless link 906, for example, a Bluetooth wireless link. In a further embodiment, a wired link may be utilized.

FIGS. 8A and 8B are a flow diagram illustrating a process for user authentication in a further example. At block 802, a plurality of user authentication pairs is stored in a memory of an authenticator device. Each authentication pair includes a challenge question and a corresponding voiceprint of a user spoken answer to the challenge question. For example, the authenticator device includes a smartphone.

At block 804, a request to authenticate a user is received. At block 806, a challenge question is selected from a selected authentication pair from the plurality of user authentication pairs. At block 808, the challenge question is output at a speaker of a body worn device. For example, the body worn device includes a head-worn device.

At block 810, a user spoken response is received at a microphone of the body worn device. At block 812, a response voiceprint is generated from the user spoken response. At block 814, an identity of the user is authenticated by comparing the response voiceprint to the corresponding voiceprint to the challenge question to determine if there is a match.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices. References to the Bluetooth protocol include any version of Bluetooth including, but not limited to Bluetooth low energy (which may utilize the Generic Attribute Profile (GATT) or Attribute Profile (ATT)) and Bluetooth Classic.

Thus, the scope of the invention is intended to be defined only in terms of the following claims as may be amended, with each claim being expressly incorporated into this Description of Specific Embodiments as an embodiment of the invention.

What is claimed is:

1. A method for using a body worn device comprising:

storing a plurality of user authentication pairs in a memory of a body worn device comprising a head-worn device, each authentication pair comprising a challenge question and a corresponding voiceprint of a user spoken answer to the challenge question;

receiving at the body worn device from an authentication requestor device a request to authenticate a user;

generating a random number;

selecting a first challenge question from a selected authentication pair from the plurality of user authentication pairs, wherein the selected authentication pair is selected utilizing the random number;

outputting the first challenge question at a speaker of the body worn device;

receiving a user spoken response at a microphone of the body worn device;

generating a response voiceprint from the user spoken response; and authenticating an identity of the user comprising comparing the response voiceprint to a first corresponding voiceprint to the first challenge question.

2. The method of claim 1, further comprising reporting an authentication success or authentication failure to the authentication requestor device.

3. The method of claim 1, further comprising outputting an authentication success voice message at the speaker of the body worn device following authenticating the identity of the user.

4. The method of claim 1, wherein the body worn device comprises a Bluetooth headset and the authentication requestor device comprises a smartphone.

5. A head worn authenticator device comprising:

a microphone;

a speaker;

a wireless communications transceiver operable to receive an authentication request from an authentication requestor device;

a processor; and a memory comprising:

two or more user authentication pairs, each authentication pair comprising a challenge question and a corresponding voiceprint of a user spoken answer to the challenge question; and an application program comprising executable instructions to receive the authentication request, generate a random number, output audio at the speaker a first challenge question selected from the two or more user authentication pairs utilizing the random number, receive a user spoken response at the microphone and generate a response voiceprint from the user spoken response, and validate an identity of a user by comparing the response voiceprint to the corresponding voiceprint to the first challenge question.

6. The head worn authenticator device of claim 5, wherein the application program further comprises executable instructions to reporting an authentication success or authentication failure to the authentication requestor device utilizing the wireless communications transceiver.

7. The head worn authenticator device of claim 5, wherein the application program further comprises executable instructions to output at the speaker an authentication success voice message at the speaker following authenticating the identity of a user.

8. The head worn authenticator device of claim 5, wherein the wireless communications transceiver comprises a Bluetooth communications transceiver.

9. The head worn authenticator device of claim 5, wherein the authentication requestor device is a smartphone.

10. A method for authenticating a user comprising:

storing a plurality of user authentication pairs in a memory of an authenticator device comprising a head-worn device, each authentication pair comprising an instruction prompt and a stored corresponding user response biometric to the instruction prompt;

receiving at the authenticator device from an authentication requestor device a request to authenticate the user;

generating a random number;

outputting a first instruction prompt from a selected authentication pair from the plurality of user authentication pairs, wherein the selected authentication pair is selected utilizing the random number;

receiving a current user response to the first instruction prompt;

generating a current user biometric from the current user response; and authenticating an identity of the user comprising comparing the current user biometric to the stored corresponding user response biometric for the first instruction prompt.

11. The method of claim 10, wherein the instruction prompt comprises a challenge question prompting the user to provide a verbal answer and the stored corresponding user response biometric to the instruction prompt comprises a voiceprint of the verbal answer.

12. The method of claim 10, wherein receiving the current user response comprises receiving a user verbal answer at a microphone of the authenticator device and generating the current user biometric from the current user response comprises generating a voiceprint from the current user response.

13. The method of claim 10, further comprising reporting an authentication success or authentication failure to the authentication requestor device.

14. The method of claim 10, further comprising outputting an authentication success voice message at a speaker of the authenticator device following authenticating the identity of the user.

15. The method of claim 10, wherein the authenticator device comprises a Bluetooth headset and the authentication requestor device comprises a smartphone.

* * * * *